(12) United States Patent
Hu et al.

(10) Patent No.: US 10,912,689 B2
(45) Date of Patent: Feb. 9, 2021

(54) ASSIST WHEEL

(71) Applicant: INDUSTRIAL TECHNOLOGY RESEARCH INSTITUTE, Hsinchu (TW)

(72) Inventors: Chia-Jui Hu, New Taipei (TW); Zeng-Lung Huang, Hsinchu County (TW); Tien-Ho Gau, Hsinchu (TW); Chou-Zong Wu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 286 days.

(21) Appl. No.: 16/226,852

(22) Filed: Dec. 20, 2018

(65) Prior Publication Data
US 2020/0107977 A1      Apr. 9, 2020

(30) Foreign Application Priority Data

Oct. 5, 2018   (TW) .............................. 107135176 A (51) Int. Cl.
*A61G 5/04*   (2013.01)
*A61G 5/10*   (2006.01)
*B60L 3/12*   (2006.01)

(52) U.S. Cl.
CPC .............. *A61G 5/048* (2016.11); *A61G 5/045* (2013.01); *A61G 5/047* (2013.01); *A61G 5/1054* (2016.11); *B60L 3/12* (2013.01); *B60L 2200/34* (2013.01)

(58) Field of Classification Search
CPC ...... A61G 5/048; A61G 5/1054; A61G 5/045; A61G 5/047; B60L 2200/34; B60L 2220/44
See application file for complete search history.

(56) References Cited

U.S. PATENT DOCUMENTS 5,234,066 A * 8/1993 Ahsing .................. A61G 5/045
                                                                180/11
6,092,615 A * 7/2000 Pusch .................... A61G 5/048
                                                                180/65.51
(Continued)

FOREIGN PATENT DOCUMENTS

CN    100431906 C    11/2008
CN    107693231 A     2/2018
(Continued)

OTHER PUBLICATIONS

Taiwan Patent Office, "Office Action", dated Jun. 19, 2019, Taiwan.
(Continued)

*Primary Examiner* — Ruth Ilan
*Assistant Examiner* — Myles A Harris
(74) *Attorney, Agent, or Firm* — Locke Lord LLP; Tim Tingkang Xia, Esq.

(57) ABSTRACT

The disclosure provides an assist wheel including a wheel, a handrim, an elastic component, two contact components, a driving assembly, two film sensors. The wheel is configured to be rotatably disposed on a wheelchair frame. The handrim is disposed on the wheel and rotatable with respect to the wheel. Two opposite ends of the elastic component are respectively connected to the wheel and the handrim. The two contact components are respectively disposed on the wheel and the handrim. The driving assembly is configured to be fixed to the wheelchair frame. The two film sensors are disposed on the driving assembly and respectively pressed by the two film sensors. Each of the two film sensors is configured to generate a sensor value. The controller is configured to receive the sensor values from the two film sensors and signal the driving assembly.

13 Claims, 12 Drawing Sheets

(56) References Cited

U.S. PATENT DOCUMENTS

| | | | |
|---|---|---|---|
| 6,302,226 B1 | 10/2001 | Kanno et al. | |
| 6,354,390 B1 * | 3/2002 | Uchiyama | A61G 5/045 180/6.5 |
| 8,641,070 B2 | 2/2014 | Birmanns et al. | |
| 8,960,712 B2 | 2/2015 | Kanno et al. | |
| 8,991,532 B2 * | 3/2015 | Wei | A61G 5/047 180/65.51 |
| 2007/0056785 A1 * | 3/2007 | Wu | A61G 5/045 180/65.51 |
| 2018/0072161 A1 | 3/2018 | Lin et al. | |

FOREIGN PATENT DOCUMENTS

| | | | | |
|---|---|---|---|---|
| DE | 19848530 C1 * | 2/2000 | | A61G 5/045 |
| EP | 2708217 A1 * | 3/2014 | | B60L 15/2036 |
| JP | 09000575 A * | 1/1997 | | B60L 50/52 |
| JP | 09215713 A * | 8/1997 | | A61G 5/1054 |
| TW | M257184 U | 2/2005 | | |
| TW | I412213 B | 10/2013 | | |
| TW | I491390 B | 7/2015 | | |
| TW | I561430 B | 12/2016 | | |
| TW | 201718305 A | 6/2017 | | |
| TW | I605809 B | 11/2017 | | |
| TW | I608186 B | 12/2017 | | |
| TW | I630126 B | 7/2018 | | |
| TW | I634312 B | 9/2018 | | |
| WO | WO-9852508 A1 * | 11/1998 | | A61G 5/1054 |

OTHER PUBLICATIONS

Yuusuke Oonishi et al., A New Control Method for Power-Assisted Wheelchair Based on the Surface Myoelectric Signal, IEEE Transactions on Industrial Electronics, 2010, vol. 57, No. 9.

Dirk van Haendel, Design of a force transducer for a wheelchair pushrim, Technische Universiteit Eindhoven Department Mechanical Engineering Control Systems Technology Group, Eindhoven, 2010.

Akira Kakimoto et al., Development of Power-Assisted Attendant-Propelled Wheelchair, Proceedings-19 International Conference—IEEE/EMBS, 1997.

Yoon Heo et la., Development of Pushrim-Activated Power-Assisted Wheelchair, Proceedings of the International Conference on Electronics and Software Science, 2015.

Rory A. Cooper et al., Performance Assessment of a Pushrim-Activated Power-Assisted Wheelchair Control System, IEEE Transactions on Control Systems Technology, 2002, vol. 10, No. 1.

* cited by examiner

ASSIST WHEEL

CROSS-REFERENCE TO RELATED APPLICATIONS

This non-provisional application claims priority under 35 U.S.C. § 119(a) on Patent Application No(s). 107135176 filed in Taiwan, R.O.C. on Oct. 5, 2018, the entire contents of which are hereby incorporated by reference.

TECHNICAL FIELD

The disclosure relates to an assist wheel, more particular an assist wheel having film sensors.

BACKGROUND

A wheelchair is a chair with wheels, used when walking is difficult due to illness, injury or disability. In general, the wheelchair has a chair, two main wheels and two handrims respectively fixed on the main wheels. The handrims sometimes known as pushrims, are the part of the wheelchair that user grips to propel the wheelchair, for those who want to self-propel their wheelchiar. However, the wheelchair is propelled manually and the user is easy be fatiguing after driving over a long distance. Therefore, motorized wheelchairs, electric wheelchairs or electric-powered wheelchairs are developed for helping those unable to propel a manual wheelchair or who may need to use a wheelchair for distances.

The electric wheelchairs include fully automatic wheelchair and assist wheelchair. The wheels of the fully automatic wheelchair are fully driven by electric motor. The wheels of the assist wheelchair are driven by the handrims and the electric motor together, and the motor can adjust the assist torque to the main wheels according to the angle that the handrim is rotated with respect to the main wheel.

SUMMARY OF THE INVENTION

One embodiment of the disclosure provides an assist wheel. The assist wheel, configured to be fixed to a wheelchair frame, includes a wheel, a handrim, an elastic component, a first contact component, a second contact component, a driving assembly, a first film sensor and a second film sensor. The wheel is configured to be rotatably disposed on the wheelchair frame. The handrim is disposed on the wheel and rotatable with respect to the wheel. Two opposite ends of the elastic component are respectively connected to the wheel and the handrim. The first contact component and the second contact component are respectively disposed on the wheel and the handrim. The driving assembly is configured to be fixed to the wheelchair frame. The first film sensor and the second film sensor are disposed on the driving assembly. The first contact component and the second contact component respectively press against the first film sensor and the second film sensor, and each of the first film sensor and the second film sensor is configured to generate a sensor value. The controller is configured to receive the sensor values from the first film sensor and the second film sensor and signal the driving assembly. When the handrim is rotated with respect to the wheel, the controller signals the driving assembly to provide an assist torque to the wheel according to the change in the differences between the two sensor values respectively generated by the first film sensor and the second film sensor.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
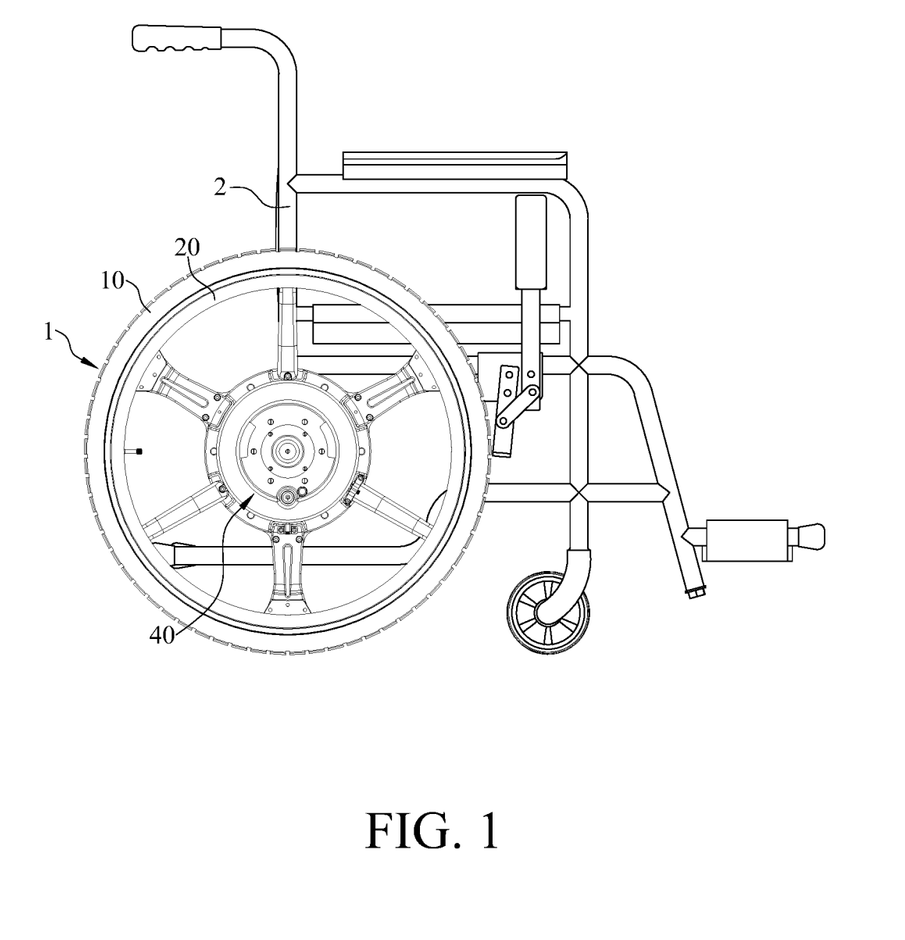
FIG. 1 is a schematic view of an assist wheel and a wheelchair frame according to a first embodiment of the disclosure.
Figure 2:
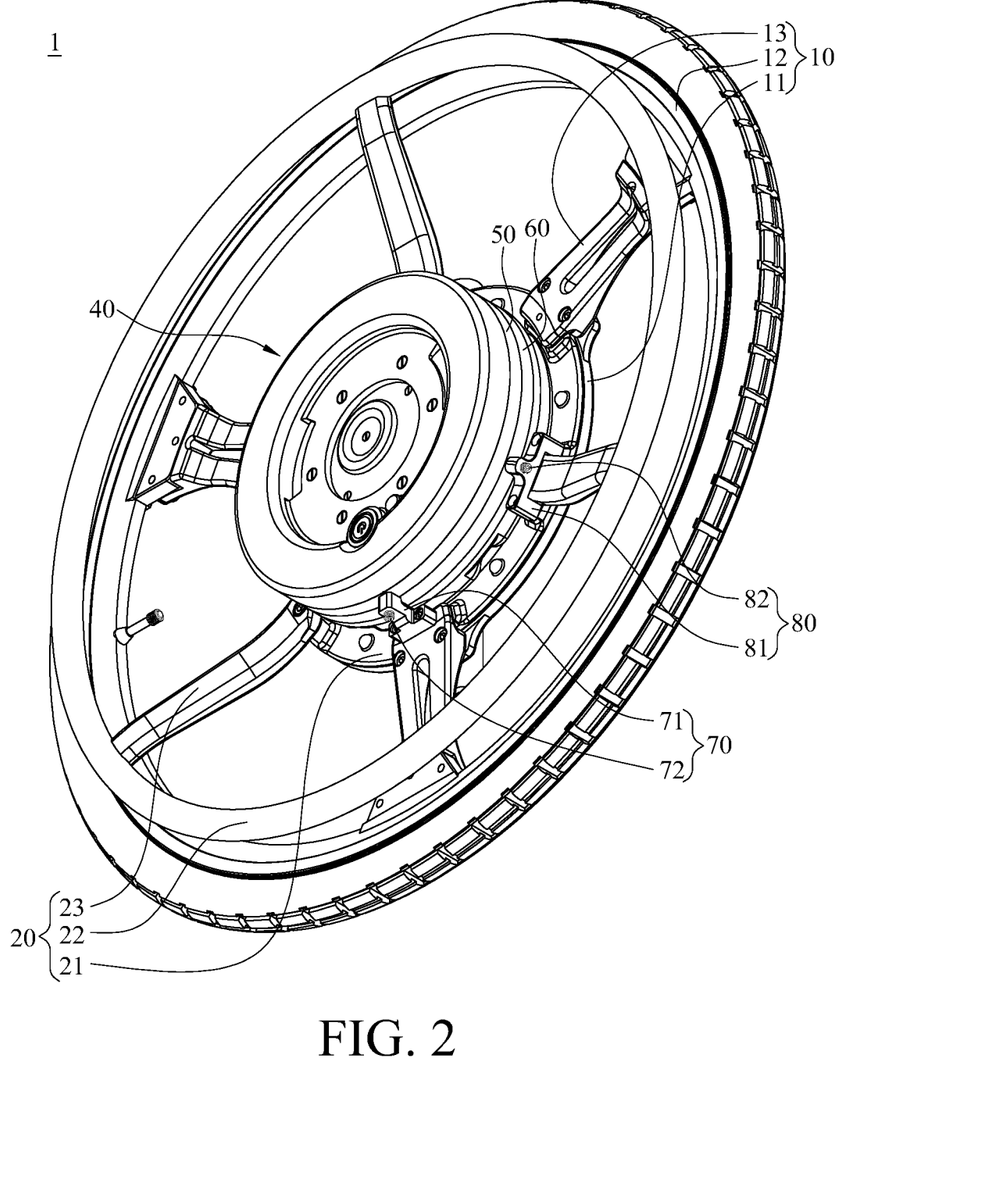
FIG. 2 is a perspective view of the assist wheel in FIG. 1.
Figure 3:
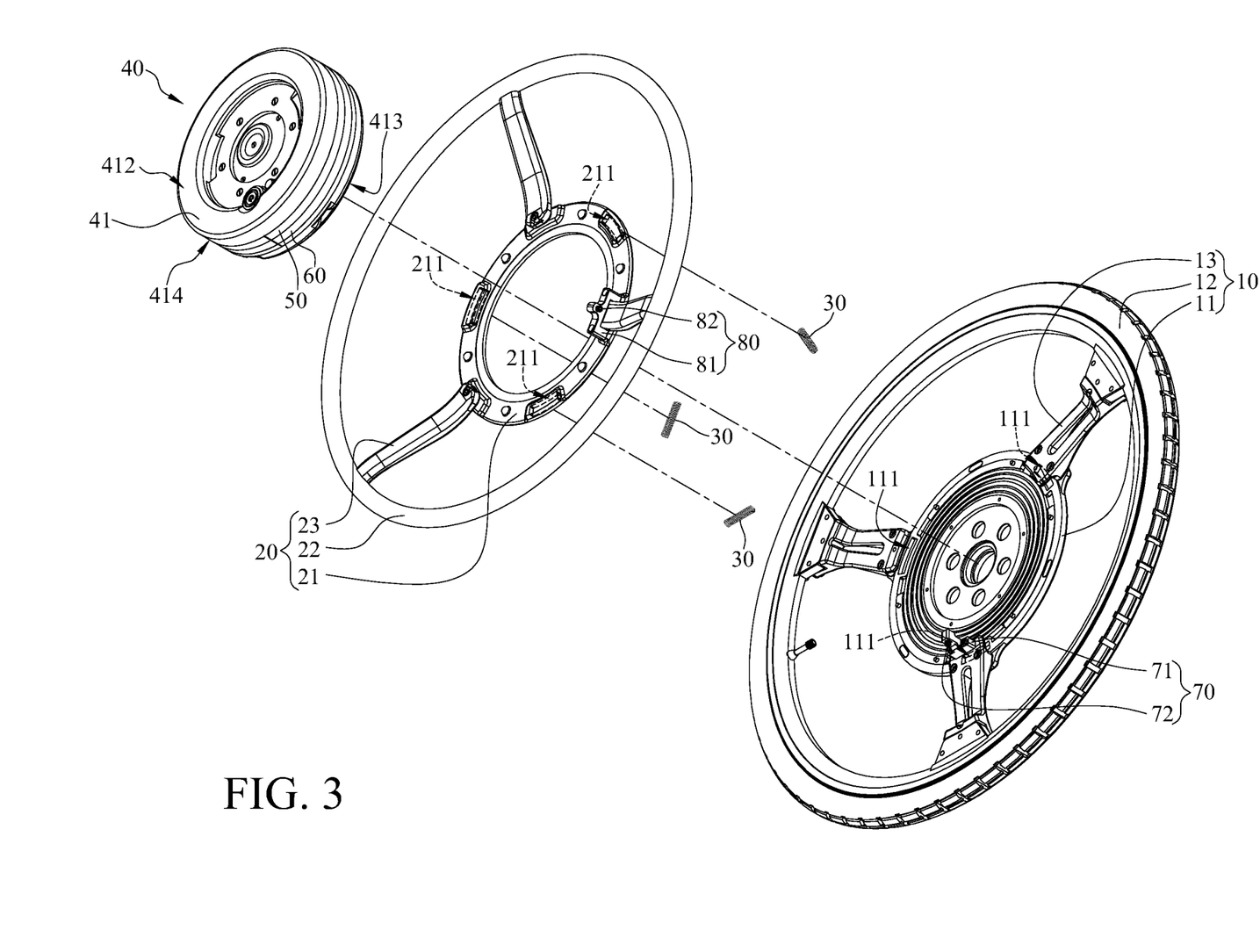
FIG. 3 is an exploded view of the assist wheel in FIG. 2.

Please refer to FIG. 1 to FIG. 3. FIG. 1 is a schematic view of an assist wheel and a wheelchair frame according to a first embodiment of the disclosure. FIG. 2 is a perspective view of the assist wheel in FIG. 1. FIG. 3 is an exploded view of the assist wheel in FIG. 2.

This embodiment provides an assist wheel 1. The assist wheel 1 is, for example, a rear wheel of an electric wheelchair. The assist wheel 1 includes a wheel 10, a handrim (known as pushrim) 20, a plurality of elastic components 30, a driving assembly 40, a first film sensor 50, a second film sensor 60, a first contact component 70 and a second contact component 80.

The wheel 10 includes a first hub part 11, a first ring part 12 and a plurality of first spoke parts 13. Two opposite ends of each of the first spoke parts 13 are respectively connected to the first hub part 11 and the first ring part 12. That is, the first ring part 12 is connected to the first hub part 11 via the first spoke parts 13. The first hub part 11 is rotatably disposed on a wheelchair frame 2 of the electric wheelchair.

The handrim 20 includes a second hub part 21, a second ring part 22 and a plurality of second spoke parts 23. Two opposite ends of each of the second spoke parts 23 are respectively connected to the second hub part 21 and the second ring part 22. That is, the second ring part 22 is connected to the second hub part 21 via the second spoke parts 23. The second hub part 21 is rotatably stacked on a side of the first hub part 11 away from the wheelchair frame 2.

Figure 4:
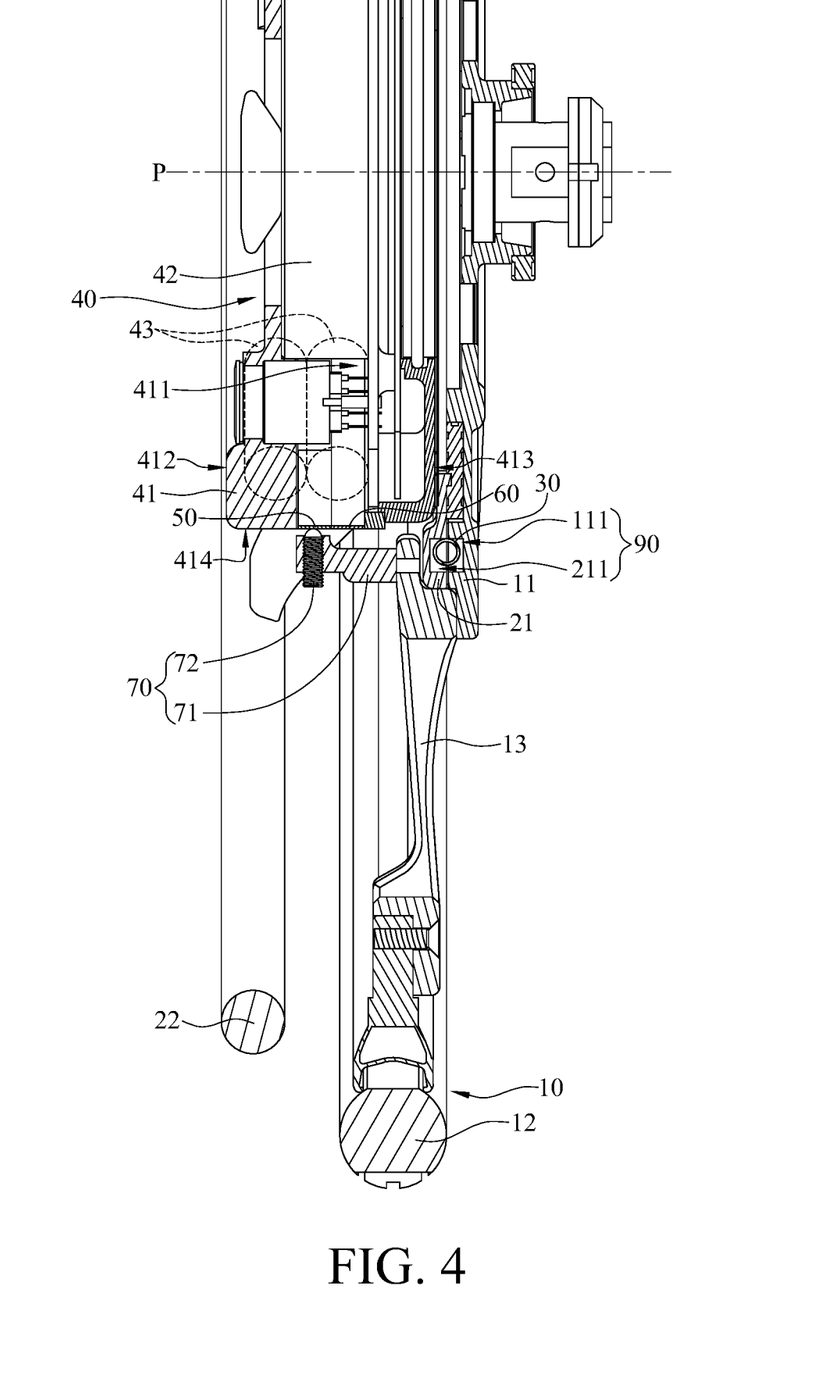
FIG. 4 is a partial cross-sectional view of the assist wheel in FIG. 2.
Figure 5:
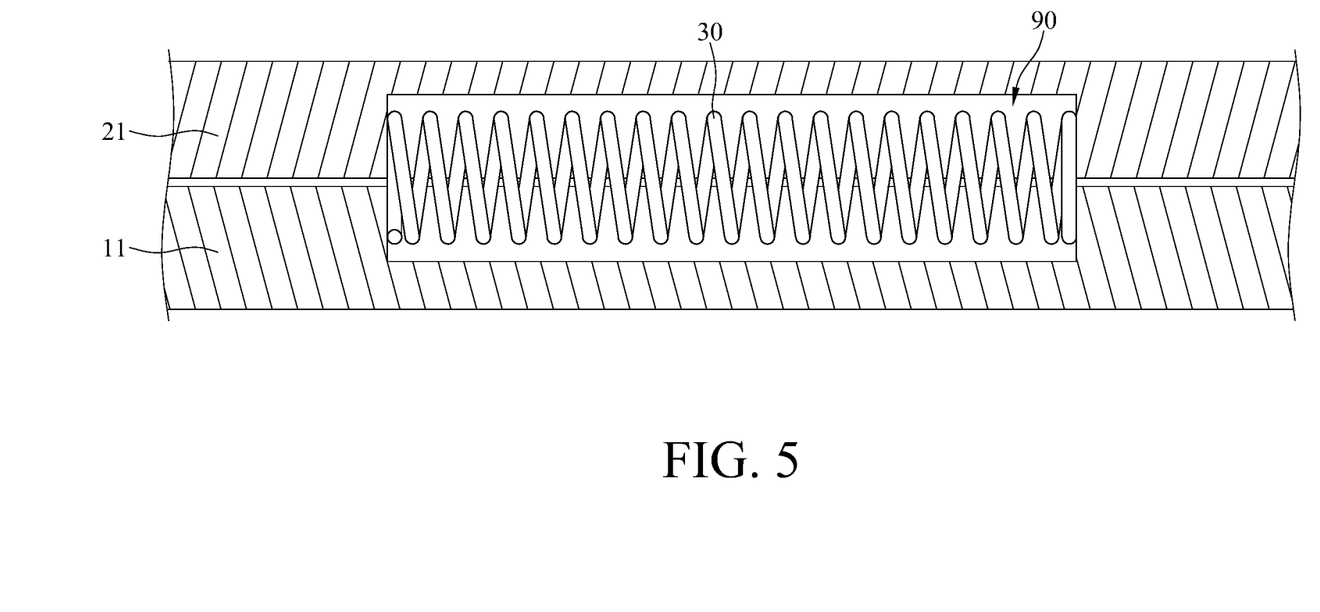
FIG. 5 is another partial cross-sectional view of the assist wheel in FIG. 2.

Then, please refer to FIG. 3 to FIG. 5. FIG. 4 is a partial cross-sectional view of the assist wheel in FIG. 2. FIG. 5 is another partial cross-sectional view of the assist wheel in FIG. 2.

In this embodiment, the first hub part 11 has a plurality grooves 111, and the second hub part 21 has a plurality of grooves 211. The grooves 111 of the first hub part 11 are located on a sides of the first hub part 11 facing the second hub part 21, and the grooves 211 of the second hub part 21 are located on a side of the second hub part 21 facing the first hub part 11. The grooves 111 of the first hub part 11 and the grooves 211 of the second hub part 21 respectively form a plurality of accommodating spaces 90 therebetween. Each of the elastic components 30 is, for example, a compression spring. The elastic components 30 are respectively disposed in the accommodating spaces 90, and both two opposite ends of each of the elastic components 30 are connected to the first hub part 11 and the second hub part 21.

The driving assembly 40 is configured to be fixed to the wheelchair frame 2 (shown in FIG. 1). The driving assembly 40 includes a casing 41, a driving component 42 and a power source 43. The casing 41 is disposed on a side of the second hub part 21 away from the first hub part 11. The casing 41 has an accommodating space 411, a first surface 412, a second surface 413 and an annular surface 414. The first surface 412, the second surface 413 and the annular surface 414 all face away from the accommodating space 411. The first surface 412 faces away from the second hub part 21, and the second surface 413 faces the second hub part 21. The annular surface 414 is located between and connected to the first surface 412 and the second surface 413. The driving component 42 is, for example, a motor. The driving component 42 and the power source 43 are located in the casing 41, and the power source 43 is electrically connected to the driving component 42. The driving component 42 is configured to drive the wheel 10 to rotate. The driving component 42, for example, directly drives the wheel 10; alternatively, the driving component 42 may drive the wheel 10 via a gear assembly or a belt. The power source 43 is, for example, a battery. The power source 43 is configured to provide electricity to the driving component 42. The first film sensor 50 and the second film sensor 60 are disposed at the annular surface 414, and the second film sensor 60 is closer to the second hub part 21 than the first film sensor 50.

The first contact component 70 includes a base part 71 and a contact part 72. One end of the base part 71 of the first contact component 70 is indirectly fixed to the first hub part 11 via one of the first spoke parts 13, and a part of the base part 71 is located at the periphery of the annular surface 414 of the casing 41. That is, a part of the annular surface 414 of the casing 41 faces the base part 71. The contact part 72 of the first contact component 70 is, for example, a spring plunger. The contact part 72 is disposed on the base part 71. The contact part 72 extends toward the annular surface 414 and presses against the first film sensor 50 so as to cause the first film sensor 50 generate a sensor value, such as a resistance value.

The second contact component 80 includes a base part 81 and a contact part 82. One end of the base part 81 of the second contact component 80 is directly fixed to the second hub part 21, and a part of the base part 81 is located at the periphery of the annular surface 414 of the casing 41. That is, a part of the annular surface 414 of the casing 41 faces the base part 81. The contact part 82 of the second contact component 80 is, for example, a spring plunger. The contact part 82 is disposed on the base part 81. The contact part 82 extends toward the annular surface 414 and presses against the second film sensor 60 so as to cause the second film sensor 60 generate a sensor value, such as a resistance value.

In this embodiment, the base part 71 of the first contact component 70 is indirectly fixed to the first hub part 11 via the first spoke part 13, but the present disclosure is not limited thereto. In some other embodiments, the base part of the first contact component may be directly fixed to the first hub part.

In addition, the base part 81 of the second contact component 80 is directly fixed to the second hub part 21, but the present disclosure is not limited thereto. In some other embodiments, the base part of the second contact component may be indirectly fixed to the second hub part via one of the second spoke parts.

Furthermore, the first hub part 11 and the first ring part 12 of the wheel 10 are connected to each other via the first spoke parts 13, and the second hub part 21 and the second ring part 22 of the handrim 20 are connected to each other via the second spoke parts 23, but the present disclosure is not limited thereto. In some other embodiments, the first hub part may be connected to the first ring part via sector-shaped plates, and the second hub part may be connected to the second ring part via sector-shaped plates.

Moreover, the location of the second film sensor 60 is not restricted. In some other embodiments, the second film sensor may be located closer to the second hub part than the first film sensor.

Figure 6:
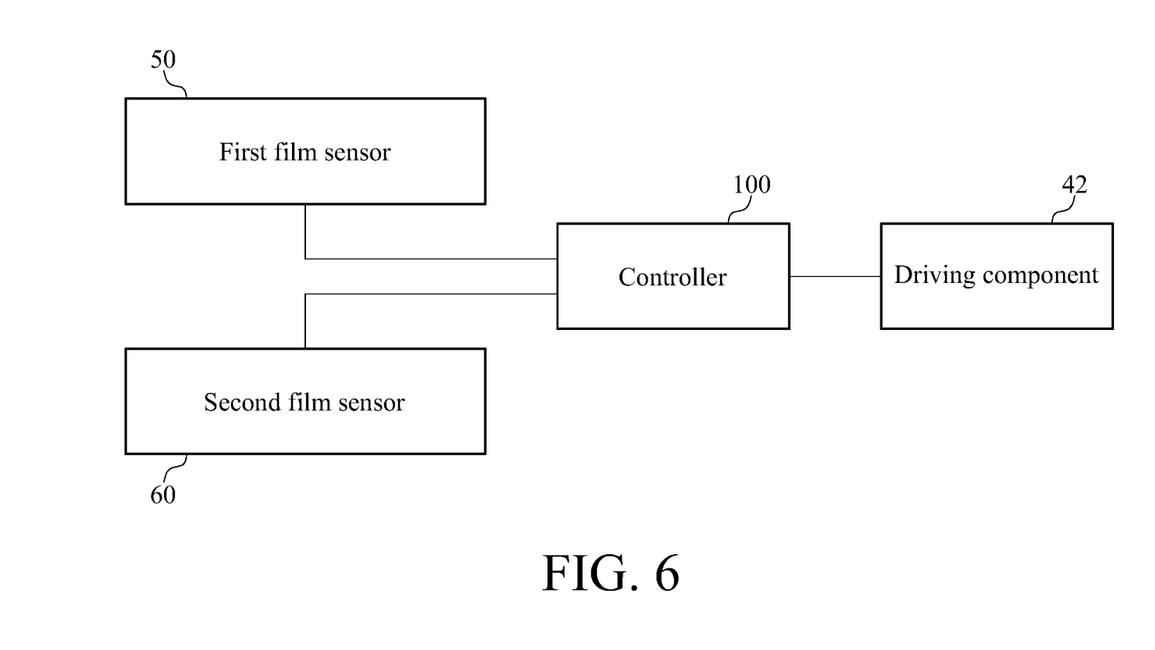
FIG. 6 is a block diagram of a part of the assist wheel in FIG. 2.

Then, please refer to FIG. 6. FIG. 6 is a block diagram of a part of the assist wheel in FIG. 2.

In this embodiment, the assist wheel 1 (shown in FIG. 2) further includes a controller 100. The first film sensor 50 and the second film sensor 60 are electrically connected to the controller 100. The controller 100 is electrically connected to the driving component 42, and the controller 100 is configured to signal the driving component 42.

Figure 7:
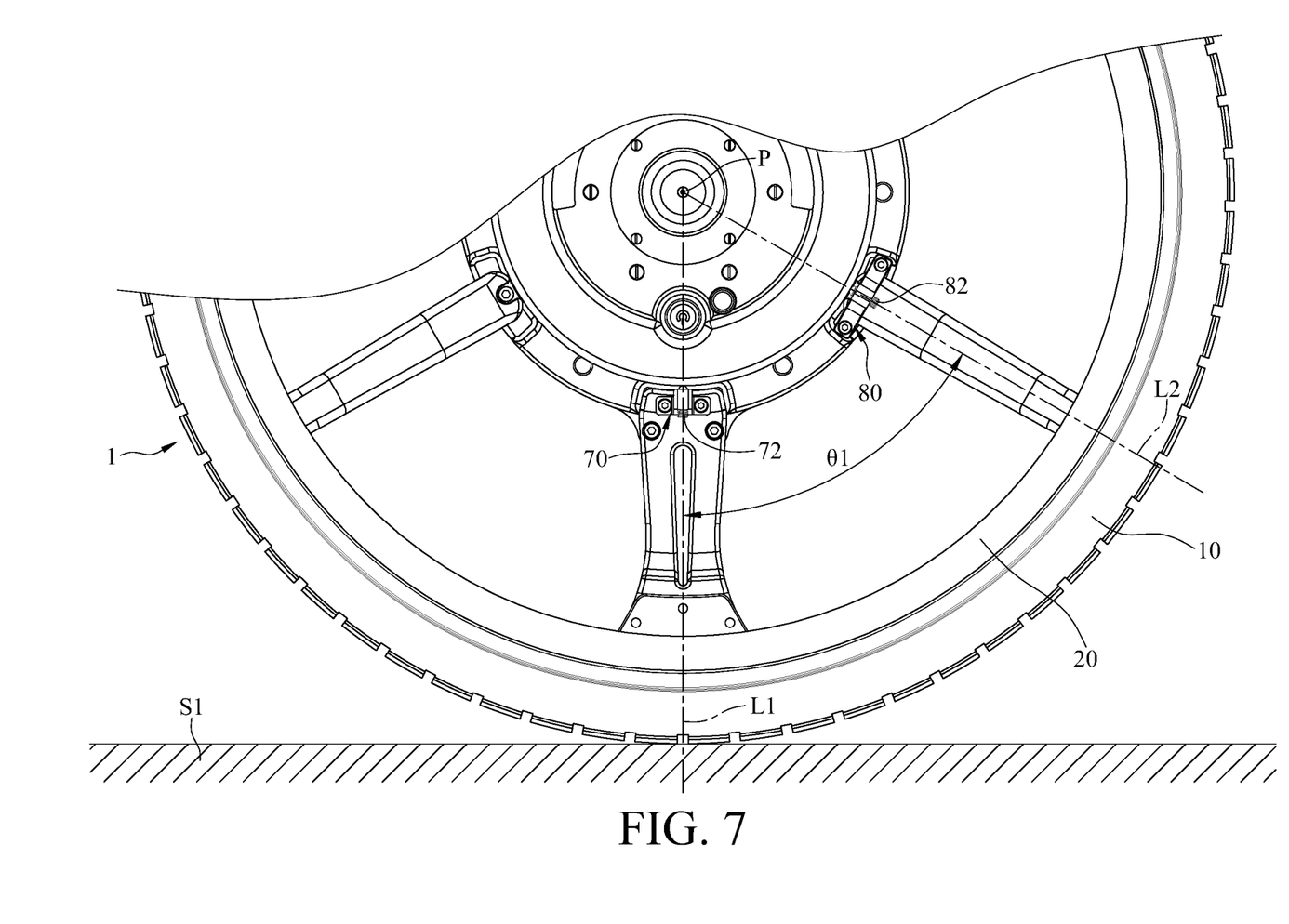
FIG. 7 is a partial lateral view of the assist wheel in FIG. 2 when the assist wheel is placed on a flat ground.

In this embodiment, the handrim 20 is rotatable with respect to the wheel 10 so as to be in an initial state or a relative moving state. In detail, please refer to FIG. 7. FIG. 7 is a partial lateral view of the assist wheel in FIG. 2 when the assist wheel is placed on a flat ground.

As shown in FIG. 7, the wheel 10 is placed on a flat ground S1, and there is no external force applied on the handrim 20. In such a case, the handrim 20 is not rotated with respect to the wheel 10 so that the handrim 20 is in the initial state. At this moment, there is a first value difference between the sensor values respectively generated by the first film sensor 50 (shown in FIG. 2) and the second film sensor 60 (shown in FIG. 2). The so-called first value difference is the resistance difference between the first film sensor 50 and the second film sensor 60. In addition, a line L1 passing through the contact part 72 of the first contact component 70 and a rotation axis P of the wheel 10 and a line L2 passing through the contact part 82 of the second contact component 80 and the rotation axis P of the wheel 10 have a first angle θ1 therebetween.

Figure 8:
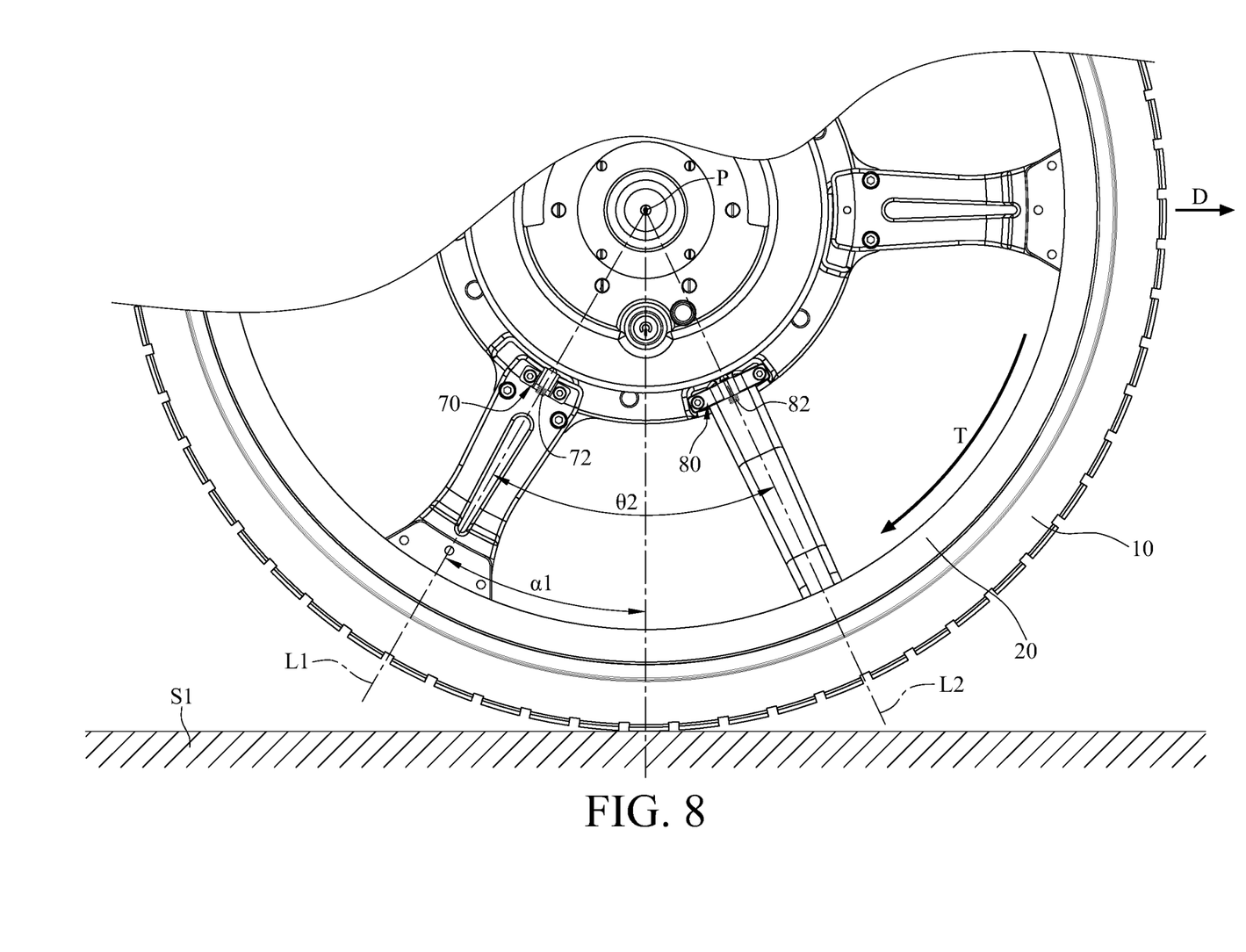
FIG. 8 is a lateral view of the assist wheel in FIG. 7 when the handrim of the assist wheel is rotated with respect to the wheel.
Figure 9:
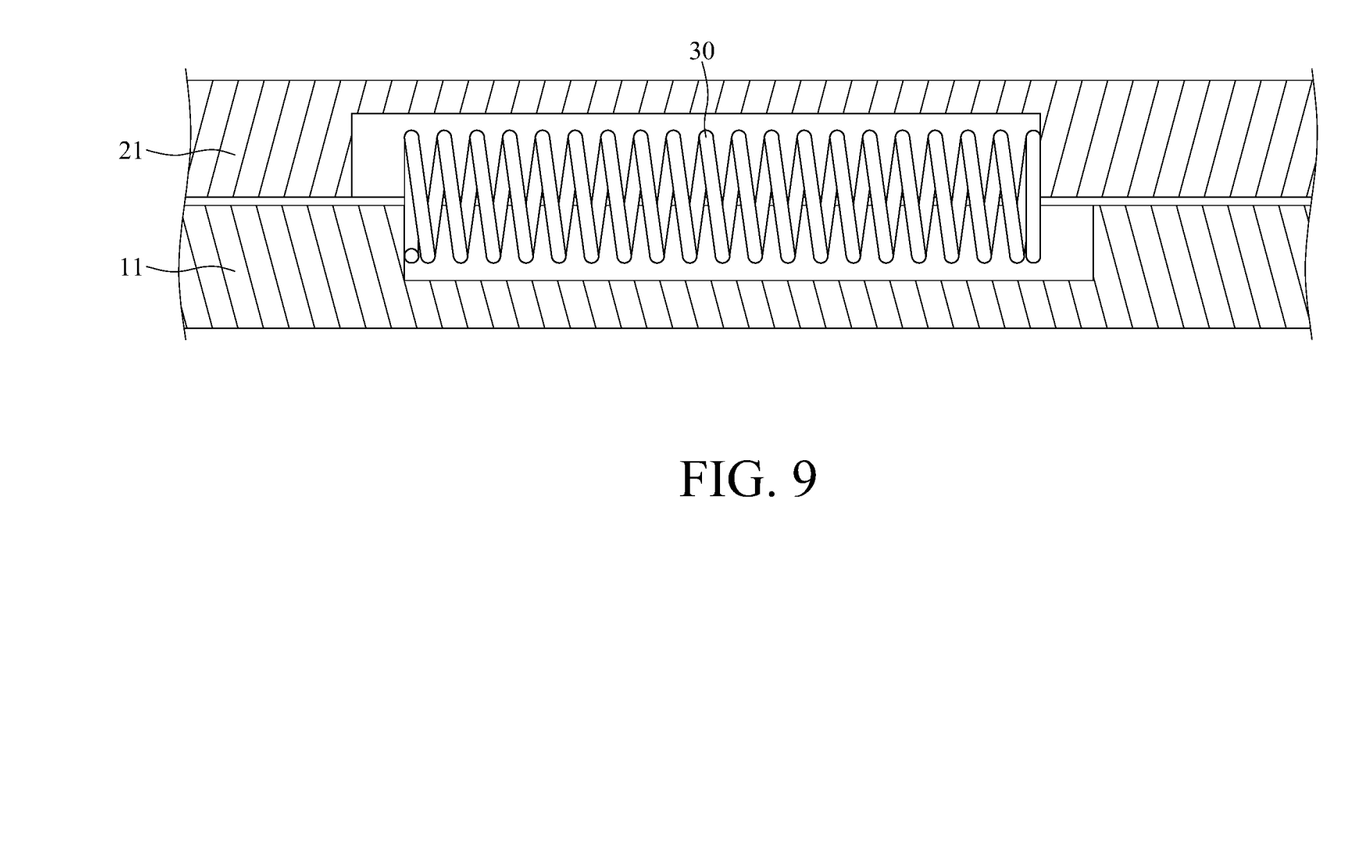
FIG. 9 is a partial cross-sectional view of the assist wheel in FIG. 8.

Then, please refer to FIG. 8 and FIG. 9. FIG. 8 is a lateral view of the assist wheel in FIG. 7 when the handrim of the assist wheel is rotated with respect to the wheel. FIG. 9 is a partial cross-sectional view of the assist wheel in FIG. 8.

When an external force in the counter clockwise (e.g., a torque T in FIG. 8) is applied on the handrim 20 to force the handrim 20 to rotate with respect to the wheel 10, the wheel 10 can be rotated by the handrim 20 via the elastic component 30 and moved forward in a direction D. As a result, the electric wheelchair is moved forward in the direction D, and the handrim 20 is in the relative moving state. During the relative moving state of the handrim 20, the second hub part 21 of the handrim 20 and the first hub part 11 of the wheel 10 compress the elastic components 30, the first angle θ1 between the line L1 and the line L2 is changed to a second angle θ2, and the first value difference between the sensor values generated by the first film sensor 50 (shown in FIG. 2) and the second film sensor 60 (shown in FIG. 2) becomes to a second value difference.

Then, the controller 100 (shown in FIG. 6) calculates the change from the first value difference to the second value difference to obtain an angle value of the rotation of the handrim 20 with respect to the wheel 10. The angle value is substantially equal to the difference between the first angle θ1 and the second angle θ2. Then, the controller 100 is able to obtain a compression deformation of each elastic component 30 by calculating the angle value. After that, the controller 100 is able to obtain a force value that compresses the elastic components 30 by calculating the compression deformation and the elastic coefficient of the elastic component 30. Then, according to the force value, the controller 100 signals the driving component 42 (shown in FIG. 6) to provide an assist torque to rotate the wheel 10. As a result, the moving wheel 10 is not only rotated by the hand but also rotated by the assist torque provided by the driving component 42 at the same time.

In addition, when the external force applied on the handrim 20 is increased, the angle value of the rotation of the handrim 20 with respect to the wheel 10 is increased, and the compression deformation of the elastic component 30 is increased as well. In such a case, the controller 100 signals the driving component 42 to provide a larger assist torque to rotate the wheel 10.

Similarly, when an external force in a direction opposite to the torque T is applied on the handrim 20 to force the handrim 20 to move forward in a direction opposite to the direction D, the driving component 42 is able to provide another assist torque to the wheel 10 so as to help the wheel 10 to move along the direction opposite to the direction D. The assist torques in either direction are obtained by the similar manner, thus the following paragraphs will not further illustrate how to obtain the assist torque in the opposite direction.

Then, as the external force applied on the handrim 20 is canceled, the second hub part 21 of the handrim 20 is rotated by the restoring force of the elastic component 30 so that the handrim 20 is returned to the initial state from the relative moving state. Since the wheel 10 is still moving, the handrim 20 is moved by the wheel 10 via the elastic components 30. As such, the angle between the line L1 and the line L2 is changed back to the first angle θ1, and the second value difference between the sensor values generated by the first film sensor 50 and the second film sensor 60 is returned to the first value difference. It is understood that the assist torque can be provided by the driving component 42 again by moving the handrim 20 again.

Figure 10:
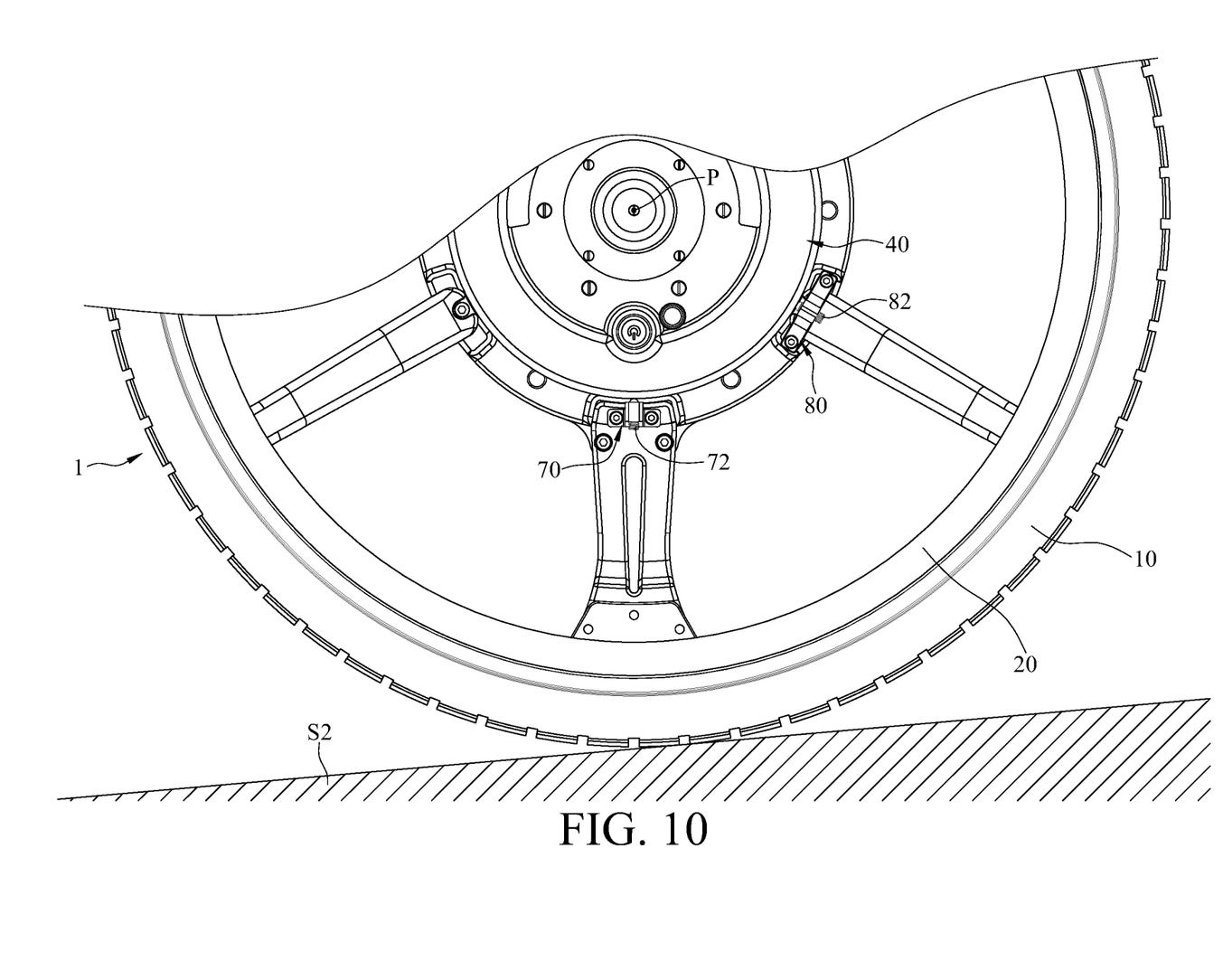
FIG. 10 is a partial lateral view of the assist wheel in FIG. 2 when the assist wheel is placed on a slope.
Figure 11:
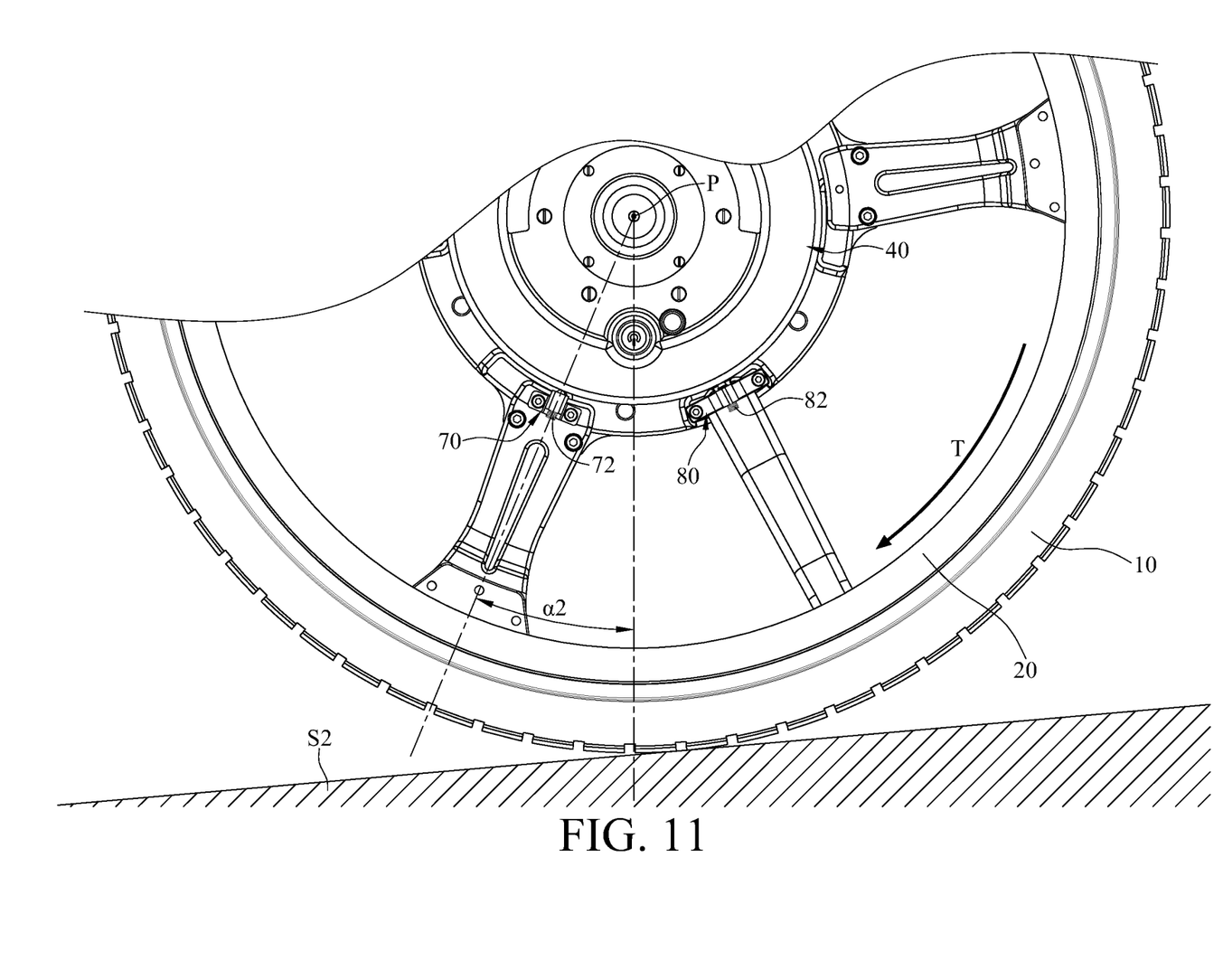
FIG. 11 is a lateral view of the assist wheel in FIG. 11 when the handrim of the assist wheel is rotated with respect to the wheel.
Figure 12:
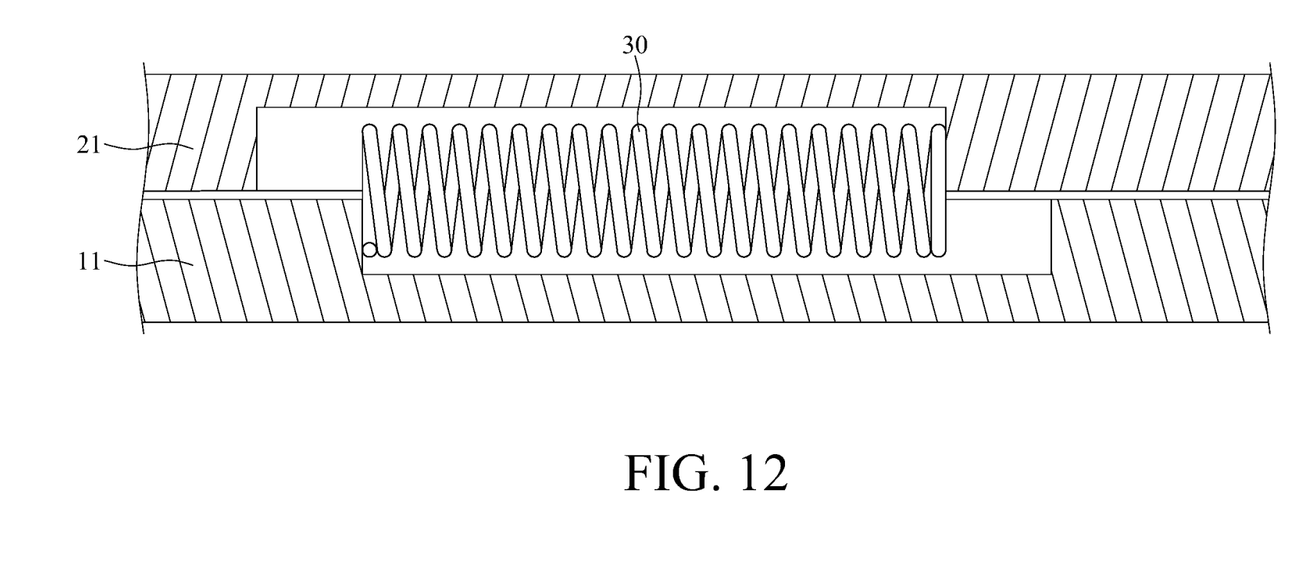
FIG. 12 is a partial cross-sectional view of the assist wheel in FIG. 11.

Then, please refer to FIG. 10 to FIG. 12. FIG. 10 is a partial lateral view of the assist wheel in FIG. 2 when the assist wheel is placed on a slope. FIG. 11 is a lateral view of the assist wheel in FIG. 11 when the handrim of the assist wheel is rotated with respect to the wheel. FIG. 12 is a partial cross-sectional view of the assist wheel in FIG. 11.

When the assist wheel 1 is placed on a slope S2 and the same external force (i.e., the torque T) in the same direction is applied on the handrim 220, a rotation angle α2 that the wheel 10 is rotated by the handrim 20 is smaller than a rotation angle α1 that the wheel 10 on the flat ground S1 (FIG. 8) is rotated by the handrim 20. Furthermore, a component force produced by the weight of the wheel 10 and the torque T are respectively transferred to two opposite ends of each elastic component 30 via the first hub part 11 of the wheel 10 and the second hub part 21 of the handrim 20, thus increasing the compression deformation of each elastic component 30. That is, the compression deformation of each elastic component 30 produced by the torque T when the wheel 10 is on the slope S2 is larger than the compression deformation of each elastic component 30 produced by the torque T when the wheel 10 is on the flat ground S1. As such, the assist torque produced by the torque T when the wheel 10 is on the slope S2 is larger than that when the wheel 10 is on the flat ground S1, which helps the assist wheel 1 to climbs slope more effortless.

In this embodiment, the controller 100 signals the driving component 42 to provide the assist torque to the wheel 10 according to the force value that deforms the elastic components 30, but the present disclosure is not limited thereto. In some other embodiments, the controller may signal the driving component 42 to provide the assist torque to the wheel 10 according to the compression deformations of the elastic components or the angle value that the handrim is rotated with respect to the wheel.

In addition, the elastic components 30 are not restricted to be the compression springs. In some other embodiments, the elastic components may be extension springs; in such a case, two opposite ends of each of the elastic components may be respectively fixed to the first hub part and the second hub part. Moreover, in another embodiment, the assist wheel may only include one elastic component.

In this embodiment, the angle value that the handrim 20 is rotated with respect to the wheel 10 is obtained from the sensor values which are resistance values and generated by the contact components 70 and 80 respectively pressing the film sensors 50 and 60, thus the angle value has better accuracy. That is, the film sensors 50 and 60 are resistance-type sensors, allowing the controller 100 to obtain an accurate angle value. Therefore, the amount of the assist torque generated by the driving component 42 is closer to the actual conditions, making the electric wheelchair having the assist wheel 1 much more convenient to use.

Moreover, the assist torque provided by the driving component 42 can be determined according to the cooperation of the first contact component 70, the second contact component 80, the first film sensor 50 and the second film sensor 60 that are lightweight. Therefore, the electric wheelchair having the assist wheel 1 is easy to carried or transported.

In this embodiment, the driving assembly 40 is, for example, detachably mounted on the wheelchair frame 2. In detail, the first film sensor 50 and the second film sensor 60 are disposed on the annular surface 414 of the casing, and the two contact parts 72 and 82 respectively press against the first film sensor 50 and the second film sensor 60, thus the driving assembly 40 is allowed to be detachable from the wheelchair frame 2. More specifically, each of the contact parts 72 and 82 has a tank, a spring located in the tank and a ball connected to the spring so that the driving assembly 40 can press against the balls to make the balls respectively press the springs and enter into the tanks, thereby helping the driving assembly 40 to be detached from the wheelchair frame 2.

Furthermore, the driving assembly 40 can be detached from the wheelchair frame 2, which makes the electric wheel easier and more effortless to carry.

In some other embodiments, the driving assembly may be inseparably fixed to the wheelchair frame.

According to the assist wheel as discussed above, the cooperation of the resistance-type film sensors and the contact components has better accuracy in measuring the angle value that the handrim is rotated with respect to the wheel, thus the assist torque generated by the driving component is closer to the actual conditions, making the electric wheelchair having the assist wheel much more convenient to use.

Moreover, the assist torque provided by the driving component can be determined according to the cooperation of the first contact component, the second contact component, the first film sensor and the second film sensor of the assist wheel that are lightweight. Therefore, the electric wheelchair having the assist wheel is easy to carried or transported.

In addition, by two film sensors being disposed on the casing of the driving assembly and respectively pressed by the contact parts, the driving assembly can be designed to be detachable from the wheelchair frame. As such, it makes the electrical wheel easier and more effortless to be carried.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An assist wheel, configured to be fixed to a wheelchair frame, comprising:
    a wheel configured to be rotatably disposed on the wheelchair frame;
    a handrim disposed on the wheel, wherein the handrim is rotatable with respect to the wheel;
    at least one elastic component, wherein two opposite ends of the at least one elastic component are respectively connected to the wheel and the handrim;
    a first contact component disposed on the wheel;
    a second contact component disposed on the handrim;
    a driving assembly configured to be fixed to the wheelchair frame;
    a first film sensor and a second film sensor disposed on the driving assembly, wherein the first contact component and the second contact component respectively presses against the first film sensor and the second film sensor, and each of the first film sensor and the second film sensor is configured to generate a sensor value; and
    a controller configured to receive the sensor values from the first film sensor and the second film sensor and signal the driving assembly;
    wherein, when the handrim is rotated with respect to the wheel, the controller signals the driving assembly to provide an assist torque to the wheel according to the change in the differences between the two sensor values respectively generated by the first film sensor and the second film sensor.

2. The assist wheel according to claim 1, wherein the wheel comprises a first hub part and a first ring part, the first ring part is connected to the first hub part, the handrim comprises a second hub part and a second ring part, the second ring part is connected to the second hub part, the second hub part is stacked on the first hub part, the at least one elastic component is located between the first hub part and the second hub part, the first contact component is disposed on the first hub part, the second contact component is disposed on the second hub part, and the driving assembly is disposed on a side of the second hub part away from the first hub part.

3. The assist wheel according to claim 2, wherein each of the first hub part and the second hub part has at least one groove, the at least one groove of the first hub part and the at least one groove of the second hub part form at least one accommodating space therebetween, and the at least one elastic component is disposed in the at least one accommodating space.

4. The assist wheel according to claim 3, wherein the quantity of the at least one elastic component is plural, the quantity of the at least one groove of the first hub part is plural, the quantity of the at least one groove of the second hub part is plural, the quantity of the at least one accommodating space is plural, the accommodating spaces are formed by the grooves of the first hub part and the grooves of the second hub part, and the elastic components are respectively located in the accommodating spaces.

5. The assist wheel according to claim 3, wherein the at least one elastic component is a compression spring, and two opposite ends of the at least one elastic component are connected to the first hub part and the second hub part.

6. The assist wheel according to claim 2, wherein the at least one elastic component is an extension spring, and two opposite ends of the at least one elastic component are fixed to the first hub part and the second hub part.

7. The assist wheel according to claim 2, wherein the driving assembly has a first surface, a second surface and an annular surface, the first surface faces away from the second hub part, the second surface faces the second hub part, the annular surface is located between and connected to the first surface and the second surface, and the first film sensor and the second film sensor are disposed on the annular surface.

8. The assist wheel according to claim 7, wherein each of the first contact component and the second contact component comprises a base part and a contact part, one end of the base part of the first contact component is fixed on the first hub part, a part of the base part of the first contact component is located at the periphery of the annular surface of the driving assembly, the contact part of the first contact component is disposed on the base part of the first contact component and extends toward the driving assembly, one end of the base part of the second contact component is fixed on the second hub part, a part of the base part of the second contact component is located at the periphery of the annular surface of the driving assembly, the contact part of the second contact component is disposed on the base part of the second contact component and extends toward the driving assembly, and the contact part of the first contact component and the contact part of the second contact component respectively press against the first film sensor and the second film sensor.

9. The assist wheel according to claim 8, wherein each of the two contact parts is a spring plunger.

10. The assist wheel according to claim 1, wherein the driving assembly comprises a casing, a driving component and a power source, the driving component and the power source are located in the casing, the power source is electrically connected to the driving component, the controller is configured to signal the driving component, and the driving component is configured to provide the assist torque to the wheel.

11. The assist wheel according to claim 10, wherein the handrim is rotatable with respect to the wheel so as to be in an initial state or a relative moving state; when the handrim is in the initial state, both of the handrim and the wheel are stationary, or the handrim is rotated with the wheel via at least one elastic component, the sensor values respectively generated by the first film sensor and the second film sensor have a first value difference therebetween, when the handrim is in the relative moving state, the handrim is rotated with respect to the wheel, and the sensor values respectively generated by the first film sensor and the second film sensor have a second value difference therebetween, the controller obtains an angle value that the handrim is rotated with respect to the wheel according to the change from the second value difference to the first value difference, and the controller signals the driving component to provides the assist torque to the wheel according to the angle value.

12. The assist wheel according to claim 11, wherein when the handrim is in the relative moving state, the at least one elastic component is deformed by the handrim and the wheel, the controller obtains a deformation of the at least one elastic component according to the angle value that the handrim is rotated with respect to the wheel, and the controller signals the driving component provides the assist torque to the wheel according to the deformation of the at least one elastic component.

13. The assist wheel according to claim 1, wherein the driving assembly is configured to be detachably fixed to the wheelchair frame.

* * * * *